A. STEWART.
WHEEL.
APPLICATION FILED JAN. 19, 1911.

1,089,284.

Patented Mar. 3, 1914.

Witnesses
Lloyd W. Patch
A. A. Hammond

Inventor
Archibald Stewart
By Vernan E. Hodge
his Attorney

United States Patent Office.

ARCHIBALD STEWART, OF KEOTA, IOWA.

WHEEL.

1,089,284.

Specification of Letters Patent.

Patented Mar. 3, 1914.

Application filed January 19, 1911. Serial No. 603,503.

*To all whom it may concern:*

Be it known that I, ARCHIBALD STEWART, a citizen of the United States, residing at Keota, in county of Keokuk and State of Iowa, have invented certain new and useful Improvements in Wheels, of which the following is a specification.

My invention relates to an improvement in wheels, more particularly adapted for automobiles, the object being to afford a uniform cushioning means for the tire, reducing the amount of rubber required, and at the same time providing a rim which may be easily applied or removed, but which will not accidentally leave its place on the wheel rim, the parts constituting the entire tire being interchangeable and replaceable.

With these objects in view, my invention consists in certain novel features of construction and combinations of parts which will be hereinafter more fully described, and pointed out in the claims.

Figure 1:
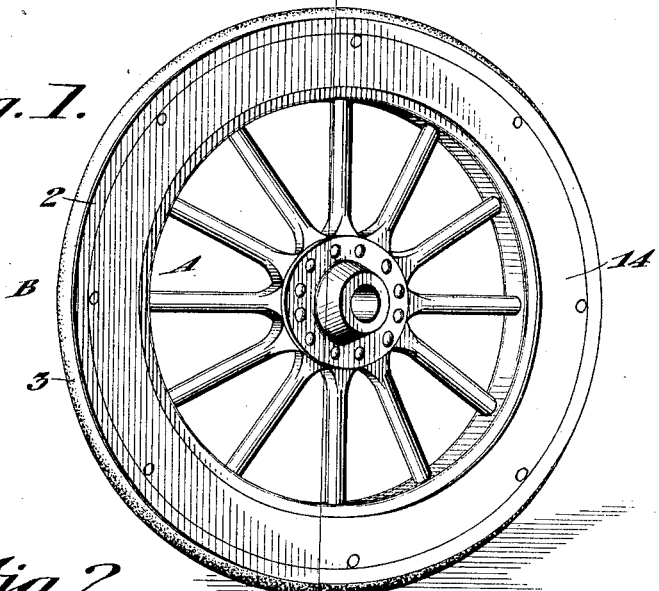
Figure 2:
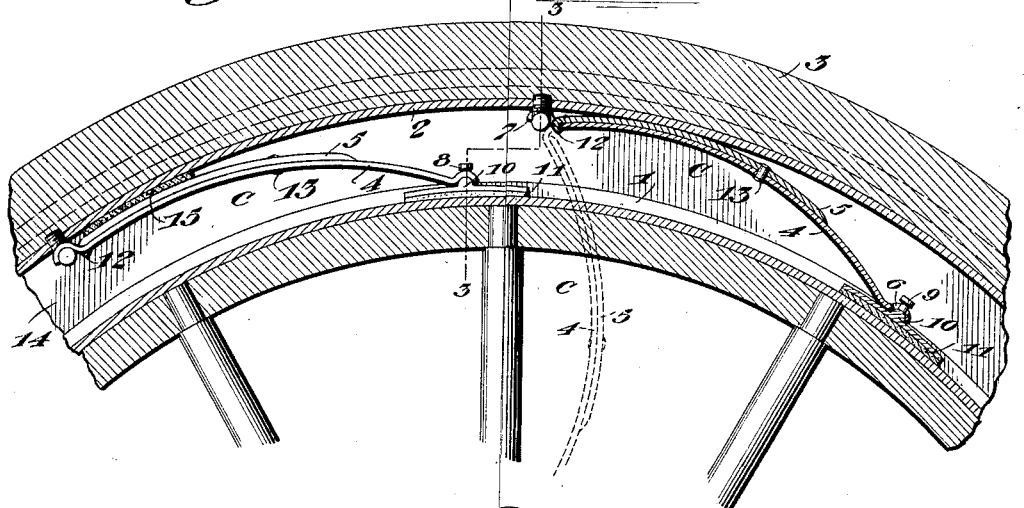
Figure 3:
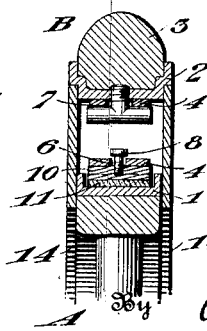

In the accompanying drawings: Figure 1 is a view in perspective, Fig. 2 is an enlarged fragmentary view in longitudinal section showing one of the springs in elevation, and Fig. 3 is a transverse section on the line 3—3 of Fig. 2.

A, represents the wheel proper having a flanged rim 1.

B is the tire comprising a metal rim 2, and solid rubber shoe 3. T-bolts are screwed at intervals into the inner face of the rim 2. The bow-springs C are preferably made in two springs, the main spring 4, and the reinforcing spring 5. The main springs 4 are rounded at both ends, one end being provided with a closed slot 6 and the other with an open slot 7, the open slot straddling the shank, and the rounded portion embracing and bearing upon the head of the T-bolt, so that it may be removably connected therewith by swinging it around to the position indicated in dotted lines in Fig. 2.

The bolt 8 of the slot 6 is held in the closed slot at the other end of the main spring in such a manner as to admit of more or less freedom of movement therein, the backs of the blocks 10, 10, having rounded portions which fit and turn in the rounded portions of the ends of the springs. The blocks 10, 10, are faced with leather, fiber, or equivalent material 11, to rest against and between the flanges of the rim 1, whereby to prevent any noise, as this facing is a non-conductor of metallic vibration. The reinforcing springs 5 are preferably hooked at 12 into the open slots and secured by a rivet or similar means 13 at another point to the main spring, thus retaining it in place at all times, and preventing rattling of the leaves constituting the springs.

The T-bolt forms the sole means of giving the oscillatory movement, and for holding the spring in place, and by means of the rounded bearings at the opposite ends of the main spring, and their connections with the T-bolts and the rounded backs of the blocks, perfect freedom of movement is afforded. This renders the friction block self-adjusting in all conditions, when the springs settle or vibrate. In this way, it will be seen that the springs are never cramped by being bolted solid to the rim, which is inclined to cause them to snap off or break at the point of contact, but instead the springs oscillate or rock at each end, at all times, under weight and strain, permitting resiliency and freedom of action at both ends. The flanges 14 of the two rims afford lateral support for the ends of the springs within which the springs are housed. Also if desired, blocks of leather or other material 15 may be inserted as a backing for the springs, as shown in Fig. 2.

More or less slight changes might be resorted to in the form and arrangement of the several parts described without departure from the spirit and scope of my invention, and hence I do not wish to be limited to the exact construction herein set forth, but:—

Having fully described my invention, what I claim as new and desire to secure by Letters Patent, is:—

1. The combination with a wheel having a flanged rim, a tire comprising a metal rim and rubber shoe, and bolts secured to the tire, of leaf springs having rounded slotted ends, the slots at one end of said leaf springs straddling the shanks of the bolts, and friction blocks having rounded backs which turn in the opposite rounded ends of the springs bearing upon the flanged rim, whereby the blocks and springs become self-adjusted.

2. The combination with a wheel and a tire detachably connected therewith and comprising a metal rim, of leaf springs and friction blocks interposed between said wheel and rim, the leaf springs pivotally and detachably connected with one of said parts, and the friction blocks pivotally connected with the free ends of said springs, said leaf springs having a curvature which bears at an intermediate point between its ends against the part to which the springs are detachably pivoted.

3. The combination with a wheel and tire revolubly mounted thereon comprising a rim, of leaf-springs connected to the inner surface of said rim, and friction blocks pivotally connected with the free ends of the springs, said leaf-springs having a curvature which bears at an intermediate point between its ends against the part to which the springs are connected.

4. The combination with two wheel rims, T-bolts, and friction blocks, of springs comprising main and reinforcing springs having rounded slotted ends connected respectively with the friction blocks and T-bolts, the reinforcing springs having hooked connection at one end with one of the slots of the main spring, and means of securing the other ends to the main spring, whereby to prevent rattling.

5. The combination with a wheel having a flanged rim, of a tire removably connected with the wheel and comprising a metal rim, springs pivotally connected with said rim, and friction-blocks connected with the free ends of these springs and bearing resiliently and removably upon the flanged wheel rim between the flanges, and flanges embracing both rims and secured to the outer rim, thereby inclosing and incasing the springs and blocks and having free sliding connection with the inner flanged rim.

6. The combination with a wheel and tire revolubly mounted thereon comprising a metal rim, of leaf springs pivotally and detachably connected with said rim, and friction blocks pivotally connected with the free ends of said springs, said leaf springs having a curvature which bears at an intermediate point between its ends against the part to which the springs are detachably pivoted.

In testimony whereof I affix my signature, in the presence of two witnesses.

ARCHIBALD STEWART.

Witnesses:
 ROBERT H. HENRY,
 A. C. SCHAUENBERG.

Copies of this patent may be obtained for five cents each, by addressing the "Commissioner of Patents, Washington, D. C."